April 23, 1968  M. P. WELSH  3,378,995
SAFETY GUARD
Filed July 1, 1965
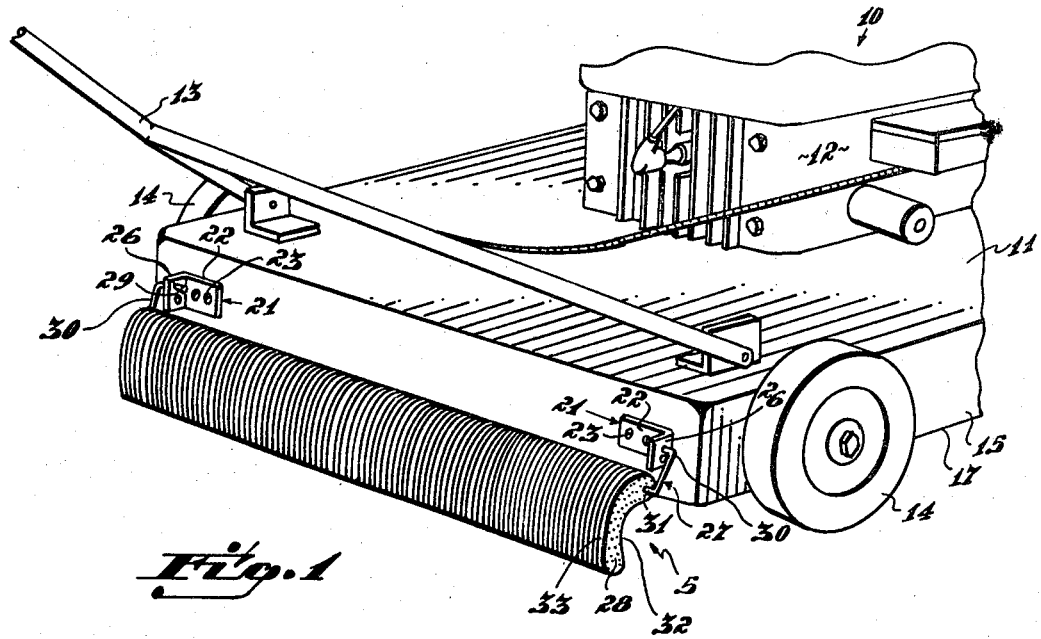
Fig. 1
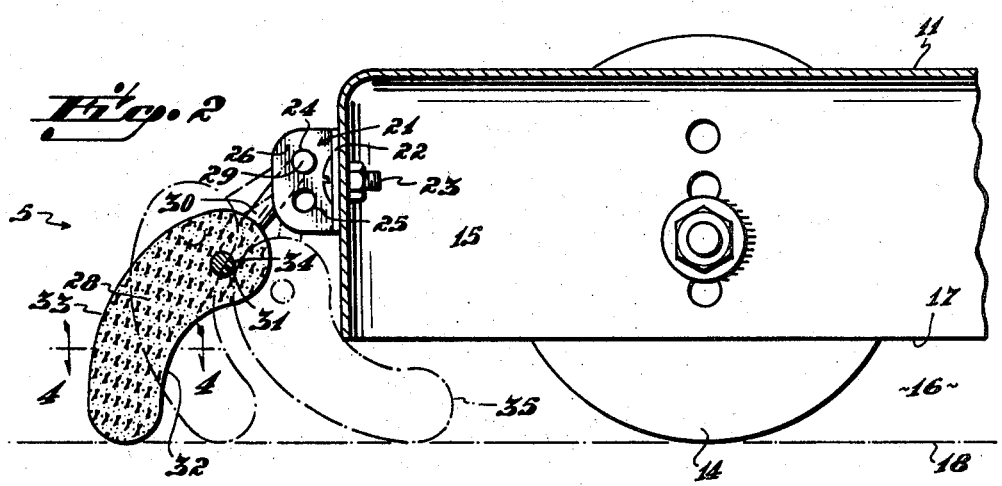
Fig. 2
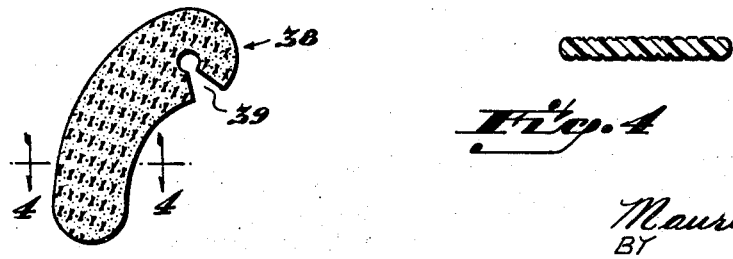
Fig. 3
Fig. 4
INVENTOR
Maurice P. Welsh
BY
Wood, Herron & Evans
ATTORNEYS

United States Patent Office 3,378,995
Patented Apr. 23, 1968

3,378,995
SAFETY GUARD
Maurice P. Welsh, 6316 Meis Ave.,
Cincinnati, Ohio 45224
Filed July 1, 1965, Ser. No. 468,871
8 Claims. (Cl. 56—25.4)

ABSTRACT OF THE DISCLOSURE

A safety guard for use of a manually operated lawn mower comprising a series of guard elements mounted for vertical movement and individual pivotal movement upon a supporting rod. The guard elements depend from the rear of the lawn mower and ride over the ground so as to block the entry of a foot of the operator into the area beneath the lawn mower.

This invention relates to a machine safety guard and more particularly to a rotary blade, power lawn mower safety device.

It has been an objective of this invention to provide an improved safety guard for a rotary blade power lawn mower or any similarly dangerous machine.

Each year thousands of injuries are recorded as a result of the use of rotary blade power mowers. Most of these accidents occur either because the operator inadvertently backs the rotating blade into his foot, or as a result of an object being hurtled out from beneath the mower by the mower blade. It has, therefore, been an objective of this invention to provide an improved safety guard for a rotary blade mower which is effective to eliminate both of these causes of lawn mower accidents, and to do so without impairing the operation of the mower.

I have discovered that rigid guard elements effective to block the entry of a person's foot beneath a mower or to prevent objects being thrown by the blade from beneath the mower, may be suspended from one side of the mower housing to close the gap between the housing and the ground if the guard elements are free for pivotal movement to allow grass and other objects to pass from beneath the mower and if the elements are free for vertical movement to allow them to pass over center, when the direction of mower movement is reversed.

In one preferred form of the invention, the guard elements are relatively thin plates pivotly suspended in side by side relation across the rear of the mower housing with their lower ends resting upon the ground. The elements are free for vertical movement and individually free for pivotal movement. The vertical movement permits the elements to pass from one side of center of their point of suspension from the housing to the other when the direction of mower movement is changed from forward to reverse. In this way, the direction of mower movement may be reversed without the guard elements digging into the ground so as to limit or stop mower movement in the reverse direction. The individual pivotal movement permits grass and other objects to pass from beneath the mower. Because the guard elements are individually articulated, the mower is easier to push or move over objects than would be the case if the complete guard was required to pivot when the guard moved over a small stone or stick. Additionally, the individual articulation minimizes the problem of cut grass accumulating under the mower housing so as to impair the mower operation and efficiency.

This guard has several advantages, among which is the ease with which it may easily be attached to any rotary blade mower with a minimum of modification of the mower. In fact, the modification consists simple of drilling a couple of holes in the mower housing to attach the guard supporting brackets.

Another advantage of this invention is the total and complete protection it affords for the feet of the operator of the mower. Because the guard never loses contact with the ground, whether it is being pushed or pulled, the operator's feet can never enter beneath the mower into the dangerous area of the blade.

These and other objects and advantages of the invention will be more readily apparent from a description of the drawings in which:

FIGURE 1 is a fragmentary perspective view of a rotary blade lawn mower equipped with a safety guard constructed in accordance with the invention of this application, FIGURE 2 is a cross-sectional view of the mower of FIGURE 1 taken along a longitudinal line of the mower, FIGURE 3 is a side-elevational view of an alternative form of a guard element for the safety guard, and FIGURE 4 is a cross-sectional view taken along the lines 4—4 of FIGURE 2 or FIGURE 3.

Referring to FIGURE 1, a guard 5 is illustrated as applied to a conventional rotary blade power mower 10 which includes a blade housing 11 upon which is mounted the blade drive motor 12. A pivotal operating or pusher handle 13 is attached to the housing 11 which in turn is supported upon vertically adjustable wheels 14 attached to a skirt 15 depending from each side of the housing.

Clearance in the form of a gap 16 is provided between the bottom 17 of the skirt 15 and the ground (indicated by a phantom line 18). This gap 16 is often wide enough for the mower to be pulled over an operator's foot, or for the rotating horizontal blade to hurl or throw a foreign object from beneath the housing with great force. To protect the operator against these and other similar hazards, the safety guard 5 is attached to the skirt 15 at the rear of the mower 10. If protection is desired in front of the mower, an identical gaurd 5 may be attached to the front of the skirt 15.

The guard 5 is pivotably supported from the skirt 15 by a pair of "L-shaped" journal brackets 21 having their bases 22 rigidly secured to the skirt by screws and nuts 23. A pair of vertically spaced apertures 24, 25 are provided in the projecting legs 26 of the brackets 21 so as to permit the gaurd 20 to be adjusted in accordance with vertical adjustment of the wheels relative to the housing 11.

Journalled within the bracket apertures 24 or 25 is a generally U-shaped support bar 27 which carries a plurality of guard elements 28. The bar 27 is a steel spreader bar having inwardly bent horizontal mounting stubs 29 on each end. Flexibility in the bar 27 permits the mounting stubs 29 to be removed from the upper set of apertures 24 and placed in the lower set 25 or vice versa without removing one of the mounting brackets 21 from the skirt 15.

A pair of radius arms 30 connect the mounting stubs 29 to a transverse section 31 of the bar 27 from which the guard elements 28 are suspended.

As best shown in FIGURE 2, each of the guard elements 28 is generally kidney-shaped with a concave inner surface 32 and convex outer surface 33 blended together by circular arcs at the top and bottom. An aperture 34 is provided near the top for pivotally mounting the elements in side by side relation or juxtaposition on the transverse section 31 of the bar 27. The preferred material for the elements is a high density polyethylene plastic with knurled or roughened side surfaces to prevent them from clinging together as a result of surface adhesion when wetted.

Referring still to FIGURE 2, it will be seen that in addition to the individual guard elements 28 pivoting about the transverse section 31 of bar 27, the bar 27 itself is also pivotable within the brackets 21 so that the transverse section 31 moves in a generally vertical arc on the radius arms 30 of the bar 27. Thus, when the lawn mower 10 is pulled rearwardly, the guard elements 28 pivot on the transverse section 31 of bar 27 while simultaneously, the transverse section of the bar moves vertically as it pivots in the brackets 21. In other words, the guard elements 28 move over center from the solid line position of FIGURE 2, the position they assume when the lawn mower 10 is moved forwardly, to the position designated by phantom line 35, the position they assume when the mower moves rearwardly.

Regardless of the direction of mower movement, the guard elements are always in contact with the ground and there is no chance of the lawn mower operator's feet getting under the mower.

If the lawn mower operator should inadvertently try to force his foot beneath the mower or try to move the mower over his foot, the inside concave edges 32 of the guard elements abut against the bottom edge of the skirt 15 to limit pivotal movement of the guard elements 28. Thus the gap 16 between the bottom of the skirt 15 and the ground is always blocked by the guard elements 28 and cannot even be forced open except by actually lifting the rear of the mower.

The guard 5 is always effective to prevent foreign objects from being hurled rearwardly from beneath the blade housing. An object hurled against the guard 5 will be caught and dropped to the ground, and the guard elements 28 will swing upwardly, out of the way and ride over it. Similarly, they will ride over collected grass or uneven terrain without opening a gap between the blade housing and the ground.

One additional advantage of this guard 5 is that it allows the mower to be angulated or pivoted on its rear wheels when making a turn without the guard plowing into the lawn. The guard elements simply pivot up out of the way while still maintaining contact with the ground.

A replacement or alternative form of guard element 38 is illustrated in FIGURE 3. This guard element is identical to the guard element 28 except that the aperture 34 is replaced by a keyhole slot 39 cut into the upper portion of the concave inner surface of the element. This slot is provided to enable the guard elements to be mounted upon the bar 27 by simply snapping or forcing the bar 27 through the slot 39.

While the guard 5 has been described in conjunction with a conventional wheeled type of lawn mower, it is to be understood that it is equally applicable to the newer "air lift" type of mower. When used with this latter type of mower, the guard not only functions as a protective device, but also serves as a seat for the mower when the air lift is turned off or ceases to function. It thus prevents scalping of the lawn by the rotating blade if for some reason the lawn mower should descend while the blade continues to rotate.

While only a single preferred embodiment of my safety device has been illustrated and described herein, those skilled in the art to which this invention pertains will readily appreciate numerous changes and modifications which may be made in the device without departing from the inventive spirit thereof. Therefore, I do not intend to be limited except by the scope of the appended claims.

Having described my invention, I claim:

1. A safety guard for use on a lawn mower, comprising spaced mounting backets for attaching said guard to the rear side of said lawn mower,
   a transverse support rod extending across the rear of said lawn mower between said brackets, said rod being vertically movable relative to said lawn mower.
   a plurality of juxtapositioned, rigid guard elements suspended from said support rod with the lower edges of said elements being adapted to rest upon the surface over which said lawn mower is movable, said elements being vertically movable with said rod, said elements being independently pivotable on said rod in a plane parallel to the direction of movement of said lawn mower whereby said elements may move over center from a position in which said elements slope rearwardly relative to said mower to a position in which they slope forwardly upon a reversal of the direction of lawn mower movement while said elements remain in engagement with said surface.

2. A safety guard for use on a lawn mower, comprising spaced mounting brackets for attaching said guard to the rear side of said lawn mower,
   a U-shaped support rod including a transverse section extending between and pivotally mounted within said brackets,
   a plurality of juxtapositioned, rigid guard elements suspended from said transverse section of said rod with the lower edges of said elements being adapted to rest upon the surface over which said lawn mower is movable, said elements being vertically movable upon vertical movement of said rod, said elements being independently pivotable on said rod in a plane parallel to the direction of movement of said lawn mower whereby said elements may move over center from a position in which said elements slope rearwardly relative to said mower to a position in which they slope forwardly upon a reversal of the direction of lawn mower movement while said elements remain in engagement with said surface.

3. A safety guard for use on a lawn mower, comprising
   spaced mounting brackets for attaching said guard to the rear side of said lawn mower,
   a U-shaped support rod including a transverse section extending between and pivotally mounted within said brackets,
   a plurality of flat, generally kidney-shaped, juxtapositioned, rigid, guard elements suspended from said transverse section of said rod with the lower edges of said elements being adapted to rest upon the surface over which said lawn mower is movable, said elements being vertically movable upon vertical movement of said rod, said elements being independently pivotable on said rod in a plane parallel to the direction of movement of said lawn mower whereby said elements may move over center from a position in which said elements slope rearwardly relative to said mower to a position in which they slope forwardly upon a reversal of the direction of lawn mower movement while said elements remain in engagement with said surface.

4. A safety guard for use on a manually operated lawn mower having a housing including a front and rear side wall, said safety guard comprising
   mounting means for attaching said guard to one of said side walls of said lawn mower housing, and
   a plurality of juxtapositioned, rigid guard elements suspended from said mounting means with the lower edges of said elements being adapted to rest upon the ground, said elements being vertically movable and independently pivotable relative to said housing whereby said elements may move over center from a position in which said elements slope rearwardly relative to said housing to a position in which they slope forwardly upon a reversal of the direction of lawn mower movement while said elements remain in engagement with the ground.
   the length of said rigid guard elements being greater than the distance from said mounting means to the ground so that said guard elements preventt a foot of the operator of said lawn mower from passing beneath said elements into the area beneath the lawn mower.

5. A safety guard for use on a manually operated lawn mower having a housing including a rear side wall, said safety guard comprising mounting means for attaching said guard to the rear side wall of said housing, and a plurality of juxtapositioned, rigid guard elements suspended from said mounting means with the lower edges of said elements being adapted to rest upon the surface over which said lawn mower is movable, said elements being vertically movable and independently pivotal in a plane parallel to the direction of movement of said lawn mower whereby said elements may move over center from a position in which said elements slope rearwardly relative to said mower to a position in which they slope forwardly upon a reversal of the direction of lawn mower movement while said elements remain in engagement with said surface.

the length of said rigid guard elements being greater than the distance from said mounting means to the surface over which said lawn mower is movable, said guard elements being operable to prevent a foot of the operator of said lawn mower from passing beneath said elements into the area beneath said mower.

6. A safety guard for use on a lawn mower having a housing including a rear side wall, said guard comprising mounting means for attaching said guard to the rear side of said lawn mower housing, a plurality of juxtapositioned, rigid guard elements suspended from said mounting means with the lower edges of said elements being adapted to rest upon the surface over which said lawn mower is movable, said elements being vertically movable and independently pivotable in a plane parallel to the direction of movement of said lawn mower whereby said elements may move over center from a position in which said elements slope rearwardly relative to said lawn mower to a position in which they slope forwardly upon a reversal of the direction of the lawn mower movement while said elements remain in engagement with said surface, the length of said rigid guard elements being greater than the distance from said mounting means to said surface, and abutment means on the rear of said lawn mower housing operable to limit forward pivotal movement of said guard elements.

7. A safety guard for use on a lawn mower having a housing including a rear side wall, said safety guard comprising spaced mounting brackets for attaching said guard to said rear wall, a support rod extending between said brackets, a plurality of juxtapositioned, rigid guard elements suspended from said support rod with the lower edges of said elements being adapted to rest upon the surface over which said lawn mower is movable, said elements being vertically movable and independently pivotable in a plane parallel to the direction of movement of said lawn mower whereby said elements may move over center from a position in which said elements slope rearwardly relative to said mower to a position in which they slope forwardly upon a reversal of the direction of the lawn mower movement while said elements remain in engagement with said surface, the length of said rigid guard elements being greater than the distance from said support rod to said surface so that said guard elements are operable to prevent a foot of the operator of said machine from passing beneath said elements into the area beneath the machine.

8. A safety guard for use on a manually operated lawn mower having a housing including front and rear side walls, said safety guard comprising mounting means for attaching said guard to one of said side walls of said machine, and a plurality of flat, generally kidney shaped, juxtapositioned, rigid guard elements suspended from said mounting means with the lower edges of said elements being adapted to rest upon a surface over which said machine is movable, said elements being vertically movable and independently pivotable relative to said lawn mower housing whereby said elements may move over center from a position in which said elements slope rearwardly relative to said lawn mower to a position in which they slope forwardly upon a reversal of the direction of lawn mower movement while said elements remain in engagement with said surface, the length of said guard elements being greater than the distance from said mounting means to said surface over which said lawn mower is movable.

References Cited

UNITED STATES PATENTS

| 2,505,377 | 4/1950 | Barker et al. | 56—25.4 |
| 2,806,339 | 9/1957 | Whitney | 56—25.4 |

ANTONIO F. GUIDA, *Primary Examiner.*